UNITED STATES PATENT OFFICE.

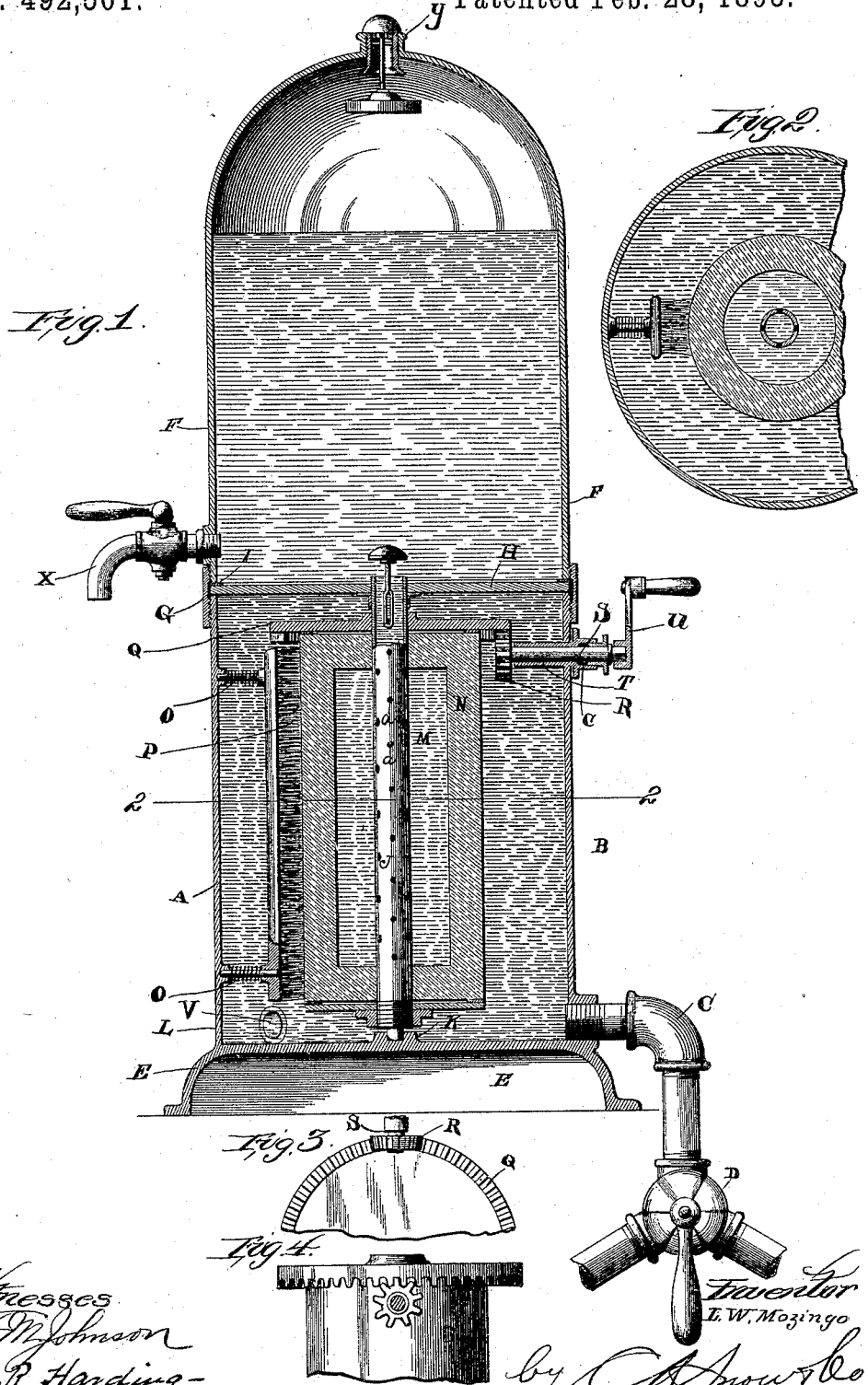

LEWIS W. MOZINGO, OF BLOOMINGTON, ILLINOIS.

PRESSURE WATER-FILTER.

SPECIFICATION forming part of Letters Patent No. 492,501, dated February 28, 1893.

Application filed May 24, 1892. Serial No. 434,139. (No model.)

*To all whom it may concern:*

Be it known that I, LEWIS W. MOZINGO, a citizen of the United States, residing at Bloomington, in the county of McLean and State of Illinois, have invented a new and useful Pressure Water-Filter, of which the following is a specification.

My invention relates to a water-filter for removing impurities from the water, and more particularly, relates to means for filtering and purifying the water under pressure, whereby the process of filtration is facilitated and rendered equal to emergencies of consumption when the water-supply is under a head or pressure.

My invention has for its object to accomplish the eradication of impurities from water under pressure in an expeditious and thorough manner so that the supply will be equal to the demand; and at the same time to provide means for automatically governing the separation of the filtered and unfiltered water simultaneously with the stoppage of the supply, for the purpose of maintaining a prescribed quantity of pure water on hand, and also for permitting removal of the impure water or the precipitated or deposited impurities.

My invention has for its further object to furnish an improved filtering agent and means for cleansing and removing any adherent or clinging foreign matter deposited upon the surface of said agent, without necessitating opening the filter.

For the attainment of these several objects, my invention consists in certain details of construction, arrangement and combination of parts, all of which will be more particularly described hereinafter, and the specific points of novelty in which will be designated in the appended claims.

Referring to the drawings forming a part of this specification: Figure 1 is a central vertical section showing my invention complete. Fig. 2 is a cross-section with parts broken away, taken on the line 2—2, Fig. 1. Fig. 3 is a detail inverted plan view of the gear and pinion for rotating the filtering cylinder against the cleaning medium. Fig. 4 is a side elevation of Fig. 3.

Like letters of reference indicate like or corresponding parts in the several views of the drawings.

A indicates the external circular casing of the hollow cylindrical reservoir B, which receives and holds the impure water fed by the supply-pipe C, having the two-way controlling-cock or valve D to admit the water into the filter. This reservoir B is air and water tight and made of suitable metal to bear the weight and pressure of the water and of required capacity; and furthermore, is provided with the integral flaring supporting base E, supporting all the parts of the superincumbent device.

F represents the reservoir casing for the filtered or purified water, and is of similar diameter, material, and shape as the reservoir B, being superposed and rigidly held thereupon by the screw-threaded connecting band G, running concentrically and exteriorly around the body of the filter, as shown in Fig. 1, and binding both reservoirs immovably together by its screw-threaded interior fitting into the correspondingly-screw-threaded exterior abutting edges of the casings A and F.

The reservoirs B and F are separated and about equally divided by the transverse horizontal diaphragm H, which rests and is supported and held between the adjacent edges of the casings A and F, and the joint thus made is rendered air and water tight by a rubber packing ring I, fitting closely in its seat upon the diaphragm and intermediate of the same and the edge of casing or reservoir F. Communication is established between the said reservoirs B and F through a central circular orifice in the diaphragm in which is inserted and journaled the upper end of the feed-pipe J, extending vertically and centrally down through the interior of the reservoir B, and is journaled in the boss K, formed on the interior of the base-plate L of the reservoir B. This shaft or pipe J is provided with a number of perforations $a\ a$, in the sides thereof, as shown, to permit the entrance of the filtered water from the sub-reservoir M, which latter is formed by a hollow cylindrical cup or block N, axially and rigidly keyed upon the pipe J and supported at its bottom by the cap $b$, which in turn is upheld by the nut $e$, on the screw-threaded end of pipe J.

This filtering cup N is made of what is known and designated as "Tripoli stone," of extremely porous nature, peculiarly adapted for this purpose, and is, as before stated, axially mounted on the shaft J, so that when the latter is rotated, the cup N will revolve with its exterior surface tangentially in contact with the stationary vertically-arranged brush P, which is normally held against the side of the cylindrical cup N, by the impact-springs O O, secured to the interior of the casing A, in a suitable manner. Thus it will be apparent that when the cup N is rotated, any loosely-adhering matter on the surface of said cup will be removed and will, either by gravity drop to the bottom of the reservoir, or be held in suspension in the water. The percolating cup N and tubular shaft J are both rotated as a whole by the gear Q, mounted on the pipe-shaft J, above the head of the cup N, and intermeshing with the pinion or cog wheel R, keyed to the horizontally-projecting crank shaft S, journaled in an air and water tight thimble T, having a packing c surrounding said shaft, said shaft S carrying the operating hand-crank U.

In the mouth of the feed-pipe J there is located a drop or check valve W, so arranged and located, as shown in Fig. 1, that when the water is cut off from the lower reservoir B by cock D, the valve W will then automatically drop by the relief of the under pressure which previously kept it "popped" or open, and the opposite pressure from the top bearing it down to its seat, thus closing the path of communication between the two compartments B and F, and thus keeping a supply of pure water in the upper reservoir. A supply of culinary or laundry water is maintained in the lower chamber B from which the impurities or sediment can be removed by opening the waste-cock V, see Fig. 1.

X indicates the drawing-off cock governing the egress of water in a filtered state from the upper reservoir and Y represents a vent or air valve placed in the dome of the upper reservoir and arranged to admit air to give atmospheric pressure on the surface of the filtered water when open, and to be closed by the rise of the same by the float forming a part of said valve being forced upwardly to its seat, thus closing the air-channel.

The tubular shaft or pipe J is very important in its tripple function, since it serves to rotate the percolating cup N, to lead out the filtered water, and to strengthen and support the cup N, which is very necessary and important.

Having thus described my invention, what I claim is—

1. In a pressure filter, the combination with a receiving reservoir, a super-imposed reservoir for filtered water, and a perforated pipe arranged axially in the receiving reservoir communicating with the upper reservoir and provided with a check valve, of a rotatable porous cylinder, mounted axially upon said pipe, a vertically-disposed brush arranged to impinge against the sides of said cylinder, impact springs to hold the brush in contact with the surface of the cylinder, and means to operate the cylinder, when desired, to remove accumulations from its walls, substantially as specified.

2. In a pressure filter, the combination of the upper and lower reservoirs, the rotatable perforated pipe mounted axially in the lower reservoir and communicating at its upper end with the upper reservoir, the check-valve in the upper end of said pipe to prevent backflow through the latter, a porous cylinder secured to and carried by said pipe, a spring-pressed brush impinging against the outer walls of the cylinder, means to rotate the cylinder, a supply pipe entering the lower reservoir, and a vent or air valve Y at the top of the upper reservoir, substantially as specified.

In testimony that I claim the foregoing as my own I have hereto affixed my signature in the presence of two witnesses.

LEWIS W. MOZINGO.

Witnesses:
JNO. H. SIGGERS,
HORACE G. PIERSON.